United States Patent [19]

Frey et al.

[11] 3,882,150

[45] May 6, 1975

[54] ANTHRAQUINONE COMPOUNDS

[75] Inventors: Wolfgang Frey, Munchenstein Basel-Land; Wolfgang Schoenauer, Riehen/BS, both of Switzerland

[73] Assignee: Sandoz Ltd., Basel, Switzerland

[22] Filed: Nov. 17, 1971

[21] Appl. No.: 199,810

Related U.S. Application Data

[62] Division of Ser. No. 808,322, March 18, 1969, Pat. No. 3,646,071.

[30] Foreign Application Priority Data

| Apr. 8, 1968 | Switzerland | 5122/68 |
| May 31, 1968 | Switzerland | 8169/68 |
| Sept. 30, 1968 | Switzerland | 14593/68 |

[52] U.S. Cl. .............. 260/380; 260/371; 260/373; 260/378; 260/381
[51] Int. Cl. ............................................. C07c 97/14
[58] Field of Search ........................... 260/380, 373

[56] References Cited
UNITED STATES PATENTS

2,117,569  5/1938  Peter.................................. 260/380

FOREIGN PATENTS OR APPLICATIONS

255,968  2/1949  Switzerland........................ 260/371
541,637  1/1932  Germany ........................... 260/380

*Primary Examiner*—Lorraine A. Weinberger
*Assistant Examiner*—Patrick J. Hagan
*Attorney, Agent, or Firm*—Gerald D. Sharkin; Richard E. Vila; Thomas C. Doyle

[57] ABSTRACT

Water-soluble anthraquinone dyes which bear one or two 3,5,5-trimethylcyclohexylamino groups in the 1- and/or 4-positions and one or two —$SO_3H$ groups bound either directly to a carbon atom of an aromatic ring or indirectly over an oxygen atom to a carbon atom of an aliphatic chain.

6 Claims, No Drawings

ANTHRAQUINONE COMPOUNDS

This is a division of application Ser. No. 808,322 filed Mar. 18, 1969, now U.S. Pat. No. 3,646,071.

This invention relates to new anthraquinone compounds, the processes of their production and their uses. These anthraquinone compounds are of formula $$A_1-NH-\begin{array}{c}CH_3\\ \langle H \rangle \\ CH_3 \quad CH_3\end{array} \qquad (I)$$

where $A_1$ represents one of the radicals (II), (III), (IV) or (V)

In formulae (II) to (V) one $R_1$ stands for a hydrogen, fluorine, chlorine or bromine atom or a $-SO_3H-$ group and the other $R_1$ for a hydrogen atom, or $R_1$ in each instance stands for a chlorine atom, $R_2$ for structures including $R_5$, $SO_3H$; $R_6-O-SO_3H$ or $-(CH_2)_m-$ with $SO_3H$, $R_3$ for alkylene-CO-N with $R_7$, $(R_8)_n$, $SO_3H$, or $(R_8)_n$, $SO_3H$, $-R_9-O-SO_3H$, $-R_{10}-$ with $SO_3H$, or $R_{12}-$ with C, H, $R_{11}$, $SO_3H$ $R_4$ for secondary alkyl having 3 to 6 carbon atoms, cyclohexyl, 3,5,5-trimethylcyclohexyl, or with $(R_8)_n$, $R_5$ for hydrogen, alkyl or alkoxy having 1 to 9 carbon atoms or halogen, $R_6$ for $-CH_2-CH_2-$, $-CH_2-CH_2-$ $CH_2-CH_2-CH-$, $-CH-CH_2-$, $-CH_2-CH-CH_2-$
  $\quad\quad\quad\quad\ \ \ \ |$     $\quad\ \ \ |$       $\quad\quad\quad\ \ \ |$
  $\quad\quad\quad\quad\ \ \ CH_3$  $\quad CH_3$   $\quad\quad\quad\ OH$ or $-CH_2-CH_2-(O-CH_2-CH_2)_p-$, $R_7$ for hydrogen or lower alkyl, $R_8$ for hydrogen, lower alkyl or alkoxy, halogen or lower acylamino, $R_9$ for $-CH_2-CH_2-$, $-CH_2-CH_2-CH_2-$, $-CH_2-CH-$,
  $\quad\quad\quad\quad\quad\quad\quad\quad\quad\quad\quad\quad\quad\quad\quad\quad\quad\quad\quad\quad\quad\quad\quad\quad\quad\ \ |$
  $\quad\quad\quad\quad\quad\quad\quad\quad\quad\quad\quad\quad\quad\quad\quad\quad\quad\quad\quad\quad\quad\quad\quad\quad\ CH_3$ $-CH_2-CH-CH_2-$, $-CH-CH_2-$ or $-CH-(CH_2-)_r$,
  $\quad\quad\ \ |$              $\quad\ \ \ |$            $\quad\quad\ \ \ |$
  $\quad\quad\ \ OH$           $\quad C_2H_5$         $\quad\quad\ CH_3$ $R_{10}$ for $-CH_2-$, $-CH-CH_2-C-$, $-CH-CH_2-CH_2-$
  $\quad\quad\quad\quad\quad\quad\ \ \ |\quad\quad\ \ |$       $\quad\quad\ \ |$
  $\quad\quad\quad\quad\quad\quad\ CH_3\ \ CH_3$    $\quad\quad CH_3$ or $-CH-CH_2-CH_2-$,
  $\ |$
  $CH_2-CH\ CH_3$
  $\quad\quad\quad |$
  $\quad\quad\ CH_3$ $R_{11}$ for hydrogen or alkyl having 1 to 8 carbon atoms, $R_{12}$ for $-CH_2-$, $-CH_2-CH_2-$ or $-CH-$,
  $|$
  $CH_3$ X for $-O-$ or $-S-$, alkylene for $-CH_2-$, $-CH_2-CH_2-$, $-CH-$, $-CH_2-CH-$ or $-CH-CH_2-$,
  $|$         $\quad\quad |$              $\quad |$
  $CH_3$    $\quad CH_3$          $CH_3$ $m$ for 1 or 2,
$n$ for 1 to 3,
$p$ for 1 to 9 and
$r$ for 1 to 6.

The $SO_3H$ group in formula (V) may be in the 6- or 7-position; the nucleus B may bear a chlorine atom or an $SO_3H$ group in the 6- or 7-position or two hydroxyl or amino groups or one hydroxyl and one amino group in the 5- and 8-positions, respectively; the nucleus C may bear 1 to 3 lower alkyl or alkoxy groups; if $n$ stands for 2 or 3, every substituent $R_8$ may have a separate significance.

The preferred compounds are those of formulae (VI), (VII)

and (VIII)

Particularly valuable compounds of formulae (VII) and (VIII) are those in which $OR_2$ stands for the radical of a sulphonated phenol which may bear an alkyl group in the para-position or for a sulphated 2-hydroxyethyl, 2-hydroxypropyl, 3-hydroxypropyl or 2,3-dihydroxypropyl radical, $R_3$ for a sulphonated benzene radical which may bear 1 to 3 lower alkyl groups, a lower alkoxy or acylamino group, or for a sulphonated benzyl or phenylalkyl radical, the radical in which is connected to the amino group through a secondary carbon atom, or for a radical of formula

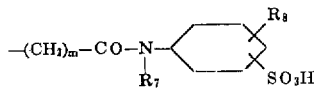

where
$m$ stands for 1 or 2,
$R_7$ for hydrogen, methyl or ethyl and $R_8$ for hydrogen, methyl, ethyl, chlorine, methoxy, ethoxy or acetylamino.

The new compounds are produced by reacting 1 mole of 3,5,5-trimethylcyclohexylamine with 1 mole of an anthraquinone compound of formula

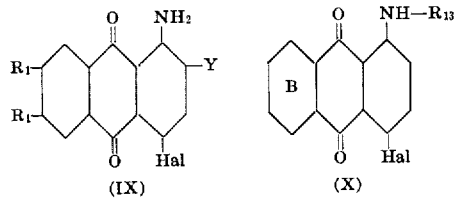

or

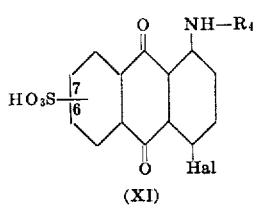

where Hal stands for chlorine, bromine or fluorine, Y for bromine or $-SO_3H$,

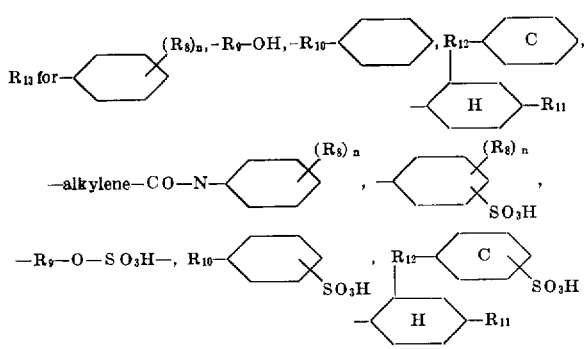

or

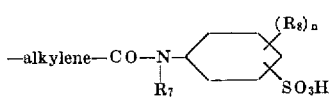

If Y represents bromine, the reaction product is treated with a water soluble neutral sulphite, or if $R_{13}$ bears no $-SO_3H$ group, with sulphur trioxide or an agent yielding sulphur trioxide.

A variation of the process consists in reacting 1 mole of an anthraquinone compound of formula

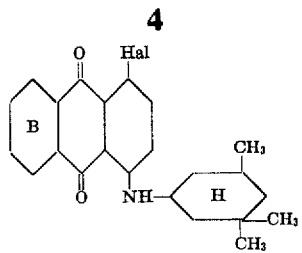

with 1 mole of an amine of formula $R_{13}-NH_2$ and, if the radical $R_{13}$ contains no $-SO_3H$ group, treating the product with sulphur trioxide or with an agent yielding sulphur trioxide.

A second variation of the process consists in reacting 1 mole of an anthraquinone compound of formula

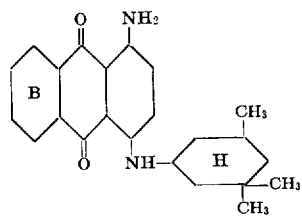

with a compound of formula

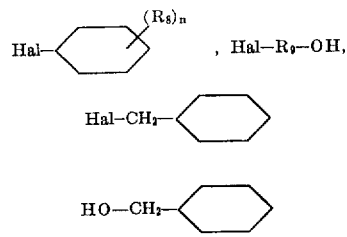

and treating the product with sulphur trioxide or an agent yielding sulphur trioxide; or reacting 1 mole of the aforesaid compound with 1 mole of an alkylenecarboxylic acid which has 3 or 4 carbon atoms and a double bond in the α-position or with a hologenoacetic acid or with a functional derivative of these acids, and then reacting with an amine or formula

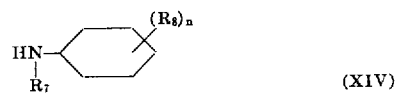

in the presence of an inorganic acid halogenide and treating the product with sulphur trioxide or an agent yielding sulphur trioxide.

A process for the production of anthraquinone compounds of formula

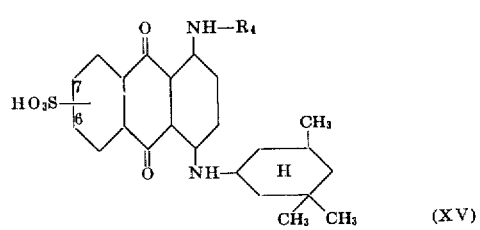

consists in reacting 1 mole of 1,4-dihydroxyanthraquinone-6-or -7-sulphonic acid with 1 mole of 3,5,5-trimethylcyclohexylamine and 1 mole of an amine of formula R₄—NH₂, or reacting 1 mole of a compound of formula (XII) in which the nucleus B bears a sulphonic acid group with 1 mole of an amine R₄—NH₂.

A process for the production of anthraquinone compounds of formula

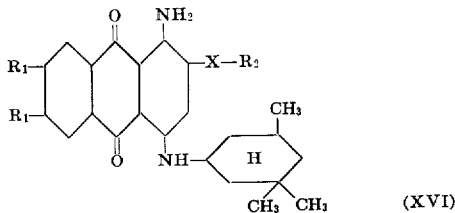

(XVI)

consists in reacting 1 mole of an anthraquinone compound of formula (IX) with 1 mole of 3,5,5-trimethylcyclohexylamine and reacting the product with 1 mole of a compound of formula

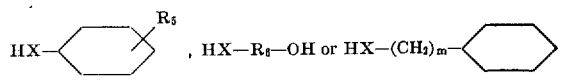

and treating with sulphur trioxide or an agent yielding sulphur trioxide.

Examples of suitable compounds of formula (IX) are 1-amino-2,4-dibromoanthraquinone, 1-amino-4-bromo-, 1-amino-4,6- and -4,7-dibromo, 1-amino-4-bromo-6-chloro- and -7-chloro, 1-amino-4-bromo-6- and -7-fluoro-, 1-amino-4-bromo-6,7-dichloroanthraquinone-2-sulphonic acid, 1-amino-4-bromoanthraquinone-2,6- and -2,7-disulphonic acid.

The following are examples of suitable compounds of formula (X): 1-phenylamino-4-bromo- and -4-chloroanthraquinone, -4,6(7)-di-chloro-, -4-bromo-6- and -7-chloroanthraquinone, -4-chloro-5,8-diamino-, -5,8-dihydroxy-, -5-amino-8-hydroxy- or -5-hydroxy-8-aminoanthraquinone and -4-bromoanthraquinone-6- and -7-sulphonic acid and their derivatives, which bear in the phenyl nucleus alkyl or alkoxy radicals having 1 to 5 carbon atoms (methyl, ethyl, isopropyl, n-propyl, n-butyl, n-amyl, tert. butyl, isobutyl, methoxy, ethoxy, n-butoxy, dimethyl, trimethyl, methylethyl, methylmethoxy, dimethoxy, diethoxy, diethyl), halogen atoms (chlorine, bromine, fluorine) or lower acylamino radicals, (acetylamino, propionylamino, n-butyrylamino, methoxycarbonylamino, ethoxycarbonylamino), as well as the corresponding compounds which are sulphonated in the substituted or unsubstituted phenyl radical; 1-(2'-hydroxyethylamino)-,1-(3'-hydroxypropyl-2'-amino)-, 1-(2',3'-dihydroxypropylamino)-, 1-(4'-hydroxybutyl-3'-amino)-,1 1-(4'-hydroxybutyl-2'-amino)-4-chloro- and -4-bromoanthraquinone, -4,6(7)-dichloro-,-4-bromo-6- and -7-chloro-anthraquinone,-4-chloro-5,8-diamino-, -5,8-dihydroxy-, -5-amino-8-hydroxy-, -5-hydroxy-8-aminoanthraquinone, -4-chloro- and 4-bromoanthraquinone-6- or -7-sulphonic acid and the corresponding compounds which are sulphated on the hydroxyalkyl group; 1-benzylamino-, 1-(4'-phenyl-4'-methyl-pentyl-2'-amino)-, 1-(4'-phenyl-butyl-2'-amino)- and 1-(6'-phenyl-2'-methyl-hexyl-4'-amino)-4-chloro- and -4-bromo-anthraquinone, -4,6- or -4,7-dichloro- or -4-bromo-6- or -7-chloro-anthraquinone, -4-chloro-5,8-diamino-, -5,8-dihydroxy-, -5-amino-8-hydroxy-, -5-hydroxy-8-amino-anthraquinone, -4-chloro- or -4-bromo-anthraquinone-6- or -7 -sulphonic acid; 1-(2'-benzyl-cyclohexylamino)-, 1-(2'-β-phenylethylcyclohexylamino)-, 1-[2'-(2''- or 4''-methylbenzyl)- and -ethylbenzyl- and -n-propylbenzyl)-cyclohexylamino]-, 1-[2'-(2''-4''- or -(2'',6''-dimethyl-benzyl)- and -diethylbenzyl)-cyclohexylamino]-, 1-[2'-(2'',4'',6''-trimethylbenzyl)-cyclohexylamino]-, 1-[2'-(2''- and -4'''-methoxy-benzyl)- or -ethoxybenzyl)- or -n-propoxybenzyl)-cyclohexyl-amino]-, 1-[2'-(2'',4''-dimethoxybenzyl)- or -diethoxybenzyl)-cyclohexyl-amino]-, 1-(2'-benzyl-4'-methyl-, -4'-ethyl-, -4'-tert.butyl-, -4'-tert.amyl- and -4'-isooctylcylohexylamino)-4-chloro- or -4-bromanthraquinone, -4,6- and -4,7-dichloro- and -4-bromo-6-or -7-chloro-anthraquinone, -4-chloro-5,8-diamino-, -5,8-dihydroxy-, -5-amino-8-hydroxy-, -5-hydroxy-8-aminoanthraquinone and -4-chloro- or -4-bromo-anthraquinone-6- and -7-sulphonic acid; as well as the corresponding compounds which are sulfonated in the aryl nucleus;1-(2'-phenylaminocarbonylethylamino)-, 1-(2'-phenylaminocarbonylpropylamino)-, 1-(1'-phenylaminocarbonylpropyl-2'-amino)-, 1-phenylaminocarbonylmethylamino-, 1-(2'-N-methyl-N-phenylaminocarbonylethylamino)-, 1-(2'-N-ethyl-N-phenylaminocarbonylethylamino)-, 1-N-methyl-N-phenylaminocarbonylmethylamino-, 1-N-ethyl-N-phenylaminocarbonylmethylamino-4-chloro- and -4-bromo-, -4,6- or -4,7-dichloro-, -4-bromo-6,7-chloroanthraquinone -4-chloro-5,8-diamino-, -5,8-dihydroxy-, -5-amino-8-hydroxy-, -5-hydroxy-8-aminoanthraquinone and -4-chloro- and -4-bromoanthraquinone-6- and -7-sulphonic acid and their derivatives which bear in the phenyl nucleus alkyl or alkoxy radicals having 1 to 5 carbon atoms (methyl, ethyl, isopropyl, n-propyl,n-butyl n-amyl, tert. amyl, tert. butyl, isobutyl, methoxy, ethoxy, n-butoxy, dimethyl, trimethyl, methyl-ethyl, methylmethoxy, dimethoxy, diethoxy, diethyl), halogen atoms (chlorine, bromine, fluorine) or lower acylamino radicals (acetylamino, propionylamino, n-butyrylamino, methoxycarbonylamino, ethoxycarbonylamino), and the corresponding compounds which are sulphonated in the substituted or unsubstituted phenyl nucleus.

The compounds of formula (X) can be produced by reacting 1 mole of a compound of formula

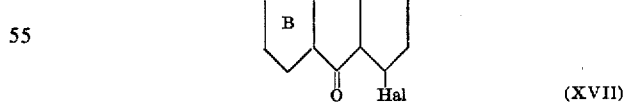

(XVII)

with 1 mole of an amine R₁₃-NH₂ or by halogenation of a compound of formula

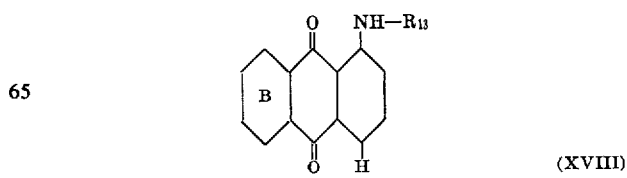

(XVIII)

The compounds of formula (X), in which $R_{13}$ represents a radical of formula

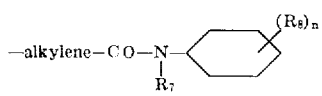

or

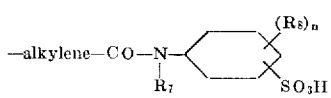

can be obtained by reacting 1 mole of a compound of formula (XVII) with 1 mole of an aminocarboxylic acid $H_2N$-alkylene-COOH and reacting with an amine of formula (XIV) in the presence of an inorganic acid halogenide or alternatively reacting with an amine of formula (XIV) with subsequent sulphonation. Another mode of operation consists in reacting 1 mole of a compound of formula

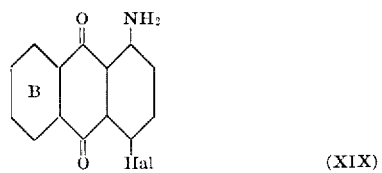

(XIX)

with 1 mole of an alkylenecarboxylic acid which has 3 or 4 carbon atoms and a double bond in the α-position, or with 1 mole of a halogenoacetic acid or a functional derivative of one of these acids, after which the product is reacted with an amine of formula (XIV) in the presence of an inorganic acid halogenide or reacted with an amine of formula (XIV) and sulphonated.

Examples of suitable compounds of formula (XI) are 1-isopropyl-, 1-sec. butyl-, 1-sec. amyl-, 1-sec. hexyl-, 1-cyclohexylamino-and 1-(3',5',5'-trimethylcyclohexylamino)-4-chloro- or -4-bromanthraquinone-6- or -7-sulphonic acid. They can be prepared by reacting 1 mole of 1,4-dihalogenoanthraquinone-6-or -7-sulphonic acid with 1 mole of an amine $R_4$—$NH_2$, or by halogenation, preferably bromination, of a 1-$R_4$-NH-anthraquinone-6- or -7-sulphonic acid.

The reaction of the 3,5,5-trimethylcyclohexylamine with the compounds of formulae (IX), (X) or (Xi) can be effected at temperatures ranging from 40° to 220°C. The water soluble anthraquinone compounds are best reacted in an aqueous or aqueous-organic medium, e.g., at temperatures of 45° to 100°C or preferably 45° to 85°C for the compounds of formula (IX) in which Y stands for $SO_3H$ while the water insoluble anthraquinone compounds are best reacted in organic medium, e.g., at 80° to 200°C or preferably 100° to 150°C, more particularly 110° – 130°C, for the compounds of formula (IX) where Y stands for a bromine atom. Mixtures of water and one or more solvents which are at least partially water soluble and are indifferent to the reactants are employed as aqueous-organic media, e.g., lower alcohols (methanol, ethanol, isopropanol, butanol, ethylene glycol), ethers (dioxan, 1,2-dimethoxy- or 1,2-diethoxyethane), ether alcohols (2-methoxy- or 2-ethoxyethanol, 2-(2' -methoxyethoxy)- or 2-(2'-ethoxyethoxy)-ethanol), ketones (methylethyl ketone), amides (dimethylformamide, dimethylacetamide), sulphoxides and sulphones (dimethylsulphoxide, sulpholan-tetramethylenesulphone). These solvents are used in amounts of up to 25 % or preferably 5 % to 15 % on the total weight of the mixture. (the pH value of a saturated aqueous solution of 3,5,5-trimethylcyclohexylamine) and of a catalyst; for this purpose preference is given to alkali metal hydroxides (sodium or potassium hydroxide) and to copper catalysts (copper powder, copper-I-oxide copper-I-chloride, copper-II-oxide). To accelerate the reaction it is desirable to employ an excess of 3,5,5-trimethylcyclohexylamine, e.g., 1.3 to 3 moles or preferably 1.5 to 2 moles, per mole of the halogenanthraquinone compound.

For the reaction in organic medium the 3,5,5-trimethylcyclohexylamine itself is employed as solvent or a solvent is used which is indifferent to the 3,5,5-trimethylcyclohexylamine and of high boiling point, e.g., 130° to 220° C, for example mono- or di-chlorobenzene, dimethylformamide, dimethylacetamide, dimethylsulphoxide, glycol ethers and in particular nitrobenzene. Examples of suitable acid binding agents are an excess of the amine, a tertiary amine of low volatility and of higher basicity than 3,5,5-trimethylcyclohexylamine, a basic metal salt such as sodium or potassium carbonate, or an alkali metal hydroxide. If necessary the aforenamed copper catalysts are employed.

The final products are isolated in the normal way, e.g., by evaporation, preferably at reduced pressure, water vapour distillation, or dilution with a suitable agent, e.g., with water when water soluble solvents are used, or with a lower alcohol such as methanol, ethanol or isopropanol or a hydrocarbon such as petroleum ether or ligroin. On isolation they are filtered with suction, washed if necessary and dried.

After condensation of the 3,5,5-trimethylcyclohexylamine with a compound of formula (IX) in which Y stands for a bromine atom the reaction product is reacted with a neutral, water soluble sulphite in aqueous-organic, e.g., aqueous-alcholic or aqueous-phenolic (phenol itself, a cresol or cresol mixture) medium, in which the concentrated sulphite solution forms the aqueous phase, at 100° to 150°C, preferably 120° – 130°C, under pressure.

If the compounds of formula (X) in which $R_{13}$ represents an aralkyl radical

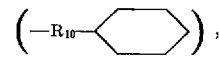, or a cyclohexyl radical

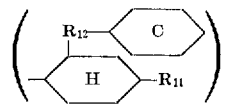

are acylated prior to condensation with 3,5,5-trimethylcyclohexylamine, the rate of reaction is greatly accelerated so that the temperature can be reduced to, e.g., 60°– 130°C or preferably 80°– 100°C, when the amine itself is used as solvent, and/or the reaction time is shortened or the formation or by-products can be greatly reduced. Examples of suitable acylating agents are lower alkanesulphonic acid chlorides (methane-and ethanesulphonic acid chlorides), arenesulphonic acid chlorides (benzene or 4-methylbenzenesulphonic acid chlorides), chlorocarbonic acid alkyl esters (chlorocarbonic acid methyl or ethyl esters) and in particular lower carboxylic acid chlorides and anhydrides (propionic acid chloride and anhydride or preferably acetic acid chloride or anhydride). The acetyl compound can be formed by adding the anthraquinone compound to five to 10 times its amount of acetic anhydride containing 2–5 % zinc chloride on the weight of the anthraquinone compound, raising the mixture from 60° to about 135°–140°C or preferably 80°–100°C and holding it at this temperature until the starting compound has disappeared, on which the mixture is cooled, run into water, the excess acetic anhydride carefully saponified and the precipitated product suctioned off, washed with water, dried and if necessary recrystallized in 100 % acetic acid or in an alcohol.

After condensation with the 3,5,5-trimethylcyclohexylamine the acyl group is split off, e.g., by treatment in 55–80 % or preferably 60–65 % sulphuric acid at 50°–80°C or preferably 60°–70°C.

The reaction of the anthraquinone compounds of formula (XII) with an amine $R_{13}$—$NH_2$ can be accomplished under the aforestated reaction conditions. Here again prior acylation of the trimethylcyclohexylamino group accelerates the rate of reaction, given a substantial excess of the unsulphonated amine.

If the reaction is conducted in an organic medium an alkali metal acetate, carbonate or hydroxide can be employed for an aromatic amine, depending on the strength of the amine, or an alkali metal carbonate or hydroxide for an amine of different type.

If the anthraquinone compound (XII) bears an —$SO_3H$ group in the 6- or 7-position it is advisable to react in aqueous or aqueous-organic medium in the presence of an acid-binding agent, e.g., an alkaline metal acetate, bicarbonate, carbonate or hydroxide when an aromatic amine is employed, or an alkali metal hydroxide in the case of an aromatic-aliphatic amine.

Suitable amines $R_{13}$—$NH_2$ include aminobenzene, 1-amino-2-, -3- or -4-methyl-, -ethyl- or -isopropylbenzene, 1-amino-2,4-, -2,5-or -2,6-dimethyl- or -diethylbenzene, 1-amino-2,4,6- or -2,4,5-trimethylbenzene, 1-amino-2-methyl-4,6-diethylbenzene, 1-amino-4-n-butyl-, 4-isobutyl-, -4-tert-butyl-, -4-tert-amyl-, -4-n-amyl-, -4-isooctyl-, -4-tert-octylbenzene, 1-amino-2-, -3- or -4- chloro- or -bromobenzene, 1-amino-2,4-dichlorobenzene, 1-amino-2-, -3- or -4-methoxy- or -ethoxybenzene, 1-amino-2,4-dimethoxy- or -diethoxybenzene, 1-amino-2,5-dimethoxy- or -diethoxybenzene, 1-amino-2-methoxy-5-methylbenzene, 1-amino-4-acetylamino-, -propionylamino-, -butylrylamino-, -methoxycarbonylamino- or -ethoxycarbonylaminobenzene, or the monosulphonic acids of these aminobenzenes corresponding to the formulae

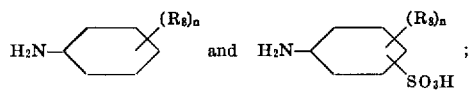

2-hydroxy-ethylamine, 2-hydroxypropylamine-1; 3-hydroxypropylamine-1; 1-hydroxypropylamine-2-, 1-hydroxybutylamine-3, 1-hydroxybutylamine-2, 2,3-dihydroxypropylamine-1 or their sulphuric acid esters corresponding to the formulae $H_2N$—$R_9$—$OH$ or $H_2N$—$R_9$—$O$—$SO_3H$ ;

benzylamine, 2-amino-4-phenylpentane, 2-amino-4-phenylbutane, 4-amino-2-methyl-6-phenylhexane or their monosulphonic acids corresponding to the formulae

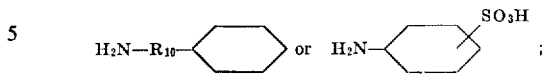

2-benzyl- or 2-phenylethyl-cyclohexylamine, 2-(2'-methyl- or -ethylbenzyl)-cyclohexylamine, 2-(4'-methyl-, -ethyl- or -n-propylbenzyl) -cyclohexylamine, 2-(2',4'- or 2-(2',6'-dimethyl- or -diethylbenzyl) -cyclohexylamine, 2-(2',4',6'-trimethylbenzyl)-cyclohexylamine, 2-(2'- or 2-(4'-methoxy-, -ethoxy- or -n-propoxybenzyl)-cyclohexylamine, 2-(2',4'-dimethoxy- or -diethoxybenzyl)-cyclohexylamine, 2-benzyl-4-methyl-cyclohexylamine or their sulphonic acids corresponding to the formulae

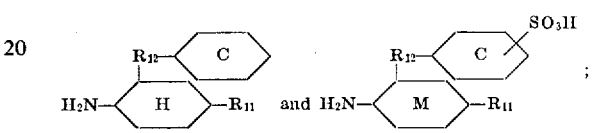

aminoacetic acid-, α-amino- or β-aminopropionic acid-, α-aminomethylpropionic acid- and β-amino-butyric acid-phenylamide, -N-methyl- or -N-ethyl-N-phenylamide, -(2'-, -3'- or -4'-methyl-, -methoxy-, -ethoxy- or -chlorophenylamide)-, -(2',4'-, -2',5'- or -2',6'-dimethylphenylamide), -(2',4',6'- or -(2',4',5'-trimethylphenylamide), -(4'-ethyl-, -(4'-isopropyl-, -(4'-n-butyl-, -(4'-isobutyl-, -(4'-tert-butyl-, -(4'-n-amyl-, -(4'-isoamyl-, -(4'-tert-amyl-, -(4'-isooctyl- or -(4'-tert-octylphenylamide), -(4'-bromophenylamide), -(2',5'-dichloro-, -(2',5'-dimethoxy- or -(2',5'-diethoxy-phenylamide), -(2'-methoxy-5'-methylphenylamide), -(4'-acetylamino-, -(4'-propionylamino-, -(4'-butyrylamino-, -(4'-methoxycarbonylamino- or -(4'-ethoxycarbonylaminophenylamide) or their monosulphonic acids corresponding to the formulae

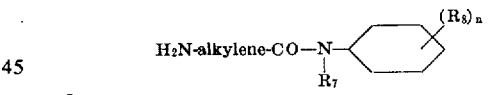

and

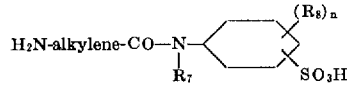

The reaction of the anthraquinone compounds of formula (XIII) with a compound

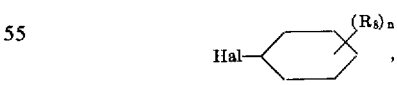

Hal—$R_9OH$ or

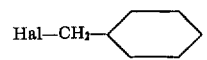

can be conducted in a substantial excess of the halogen compound or in a polar solvent such as dimethylformamide, dimethylsulphoxide or preferably nitrobenzene at 90° to 200°C, preferably 130°–180°C or more particularly 135°–150°C for the aryl halides, preferably 80°–130°C or in particular 100°–110°C for the benzyl halides, and 80°–130°C for the hydroxyalkylhalides, and in the presence of an acid-binding agent such as alkali metal acetate, carbonate, bicarbonate or hydroxide and of a copper catalyst (copper powder, copper-I-oxide or copper-I-chloride).

The compounds of formula (XIII) can be produced by condensation of bromamic acid or its derivatives with 3,5,5-trimethylcyclohexylamine and desulphonation, or by reaction of 1 mole of a dihalogen compound of formula (XVII) in either sequence with 1 mole of 3,-5,5-trimethylcyclohexylamine and 1 mole of ammonia or of an aliphatic or aromatic sulphonic acid amide ($CH_3$—$SO_2$—$NH_2$, $C_2H_5$—$SO_2$—$NH_2$,

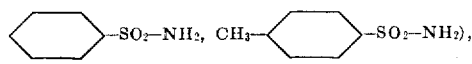

in the latter case with subsequent cleavage of the sulphonic acid radicals.

Amongst the halogen compounds suitable for reaction with aminoanthraquinone compounds of formula (XIII) may be mentioned bromobenzene, 1,2-, 1,3- and 1,4-dibromobenzene, 1-bromo-2-, -3- and -4-methyl- and -ethylbenzene, 1-bromo-2-, -3- and -4-chlorobenzene, 1-bromo-2,-3- and -4-methoxy- or -ethoxybenzene, 1-bromo-2,4,6-trimethylbenzene, 1-bromo-2-methoxy-5-methylbenzene, 1-bromo-4-isopropyl-, -4-n-butyl-, -4-tert-butylbenzene, 1-bromo-4-acetylamino-, -4-propionylamino- and -4-butyrylaminobenzene, corresponding to the formula

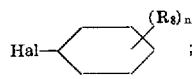

2-chloro- or 2-bromethanol, 2-chloro- or 2-bromopropanol-1, 1-chloro or 1-bromo-2-propanol, 3-chloro- or 3-bromopropanol, 1-chloro- or 1-bromo-2,3-propanediol, corresponding to the formula Hal—R$_9$—OH; benzyl chloride or benzyl bromide corresponding to the formula

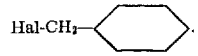

It is of advantage to react the aminoanthraquinone compounds of formula (XIII) with benzyl alcohol in a substantial excess of the alcohol within the temperature range of 80° to 130°C or preferably 100°–110°C and in the presence of iodine as catalyst, the amount of iodine being about 3 to 15 % or preferably 8–12 % of the aminoanthraquinone compound.

The reaction of aminoanthraquinone compounds of formula (XIII) with alkylenecarboxylic acids having 3 or 4 carbon atoms and a double bond in α-position, or with functional derivatives of these acids, e.g., acrylic acid, acrylic acid ester, amide, or nitrile, methacrylic acid, methacrylic acid ester or crotonic acid, can be conveniently effected in sulphuric acid solution using sulphuric acid preferably of 50 to 96 % strength.

The reaction takes place at temperatures between 40° and 100°C or preferably at 60°–80°C. The amount of alkylenecarboxylic acid employed must be at least 1 mole. It is often of advantage to employ an excess of the alkylenecarboxylic acid in order to achieve good yields. The addition of a further acid, e.g., concentrated phosphoric acid, can accelerate the reaction. In the course of the reaction the functional derivatives are often hydrolysed to the free acids. Should this not be so, hydrolysis is carried out subsequent to the reaction.

The reaction products can be isolated as described in British Pat. No. 841,927.

The reaction of aminoanthraquinone compounds of formula (XIII) with a halogenoacetic acid can be accomplished in melted bromacetic or chloracetic acid, if desired in the presence of an alkali metal acetate and a copper compound, at temperatures of 60° to 120°C or optimally at 80°–90°C, or in an inert organic solvent such as phenol, a cresol or cresol mixture or naphtha in the presence of an alkali metal acetate and a copper compound at temperatures of 100° to 150°C or preferably 100°–120°C. To isolate the product it is best to distill off the solvent, e.g., with water vapour or under reduced pressure; the product is then precipitated by the addition of salt or acid, filtered off with suction and purified in the normal manner.

For amidation the dry carboxylic acids thus obtained are reacted with an amine of formula (XIV) in the presence of a halide of an acid (thionyl chloride, phosphorus oxychloride, phosphorus pentachloride, phosphorus pentabromide, or preferably phosphorus trichloride or tribromide) and in an inert organic solvent, e.g., a halogenated or unhalogenated hydrocarbon such as chloroform, carbon tetrachloride, benzene, toluene, xylene, chlorobenzene, dichlorobenzene, or in an ether such as dioxane,1,2-dimethoxy- or 1,2-diethoxyethane, di-isopropyl-, di-n-propylether, or in a tertiary amine (pyridine, a mixture of pyridine bases, quinoline, dimethylaminobenzene or diethylaminobenzene). In place of an inert organic solvent the amine of formula (XIV) itself can be employed as solvent. The reaction is effected at temperatures between 0° and 50°C in the presence of one of the aforenamed acid halides and is brought to a close at temperatures of 0° to 100°C or preferably 40° to 80°C. The resulting carboxylic acid phenylamides can be isolated in the normal way as described in the examples of British Pat. No. 1,061,424.

The reaction of 1,4-dihydroxyanthraquinone-6-sulphonic acid with 1 mole of 3,5,5-trimethylcyclohexylamine and 1 mole of an amine R$_4$—NH$_2$ can be carried out at temperatures of 50° to 150°C or preferably at 80°–120°C. By the addition of boron compounds (boric acid, boron trifluoride) and/or by employing the 1,4-dihydroxyanthraquinone-6-sulphonic acid wholly or partially in the form of the leuco compound, the introduction of a second 3,5,5-trimethylcyclohexylamino group can be appreciably accelerated. The reaction can be effected in a substantial excess of 3,5,5-trimethylcyclohexylamine or, particularly when condensation with two different amines is involved, in an inert organic solvent, e.g., an alcohol such as ethanol, n-propanol, n- or isobutanol, n- or iso-amyl alcohol, a glycol such as ethylene glycol, 1,2-propylene glycol, diethylene glycol, dipropylene glycol, or tripropylene glycol, an ether alcohol such as 2-methoxy-, 2-ethoxy- or 2-n-butoxyethanol, 2-(2-methoxy-, -ethoxy- or -n-butoxyethoxy)-ethanol, or in an ether such as dioxane, and if necessary with the addition of up to 30 % water. After the condensation reaction, which takes place preferably in the absence of air, e.g., in a nitrogen or illuminating gas atmosphere, the leuco compound is reoxidized, e.g., by the introduction of air.

The reaction product of formula

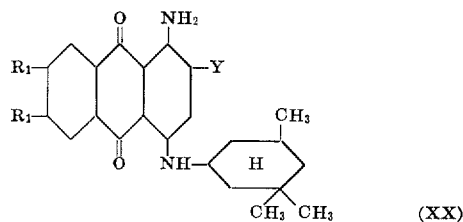

prepared from 3,5,5-trimethylcyclohexylamine and a compound of formula (IX), is reacted with hydroxy or thiol compounds of formulae

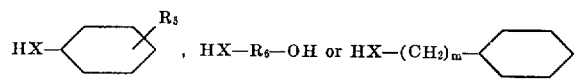

at temperatures of e.g., 50° to 200°C, preferably at 50° to 150°C or optimally at 60° to 120°C in the case of the thiol compounds, and 100° to 200°C or more particularly 110° to 180°C in the case of the hydroxyl compounds, and in the presence of acid-binding agents such as alkali metal carbonates or hydroxides. It is advantageous to react in an inert solvent, e.g., an alcohol such as ethanol, butanol, cyclohexanol, an ether alcohol such as 2-methoxy-, 2-ethoxy- or 2-butoxyethanol, 2-(2'-methoxy-, 2-(2'-ethoxy- or 2-(2'-butoxy-ethoxy)-ethanol, an ether such as dioxane, or in a hydrocrbon such as cyclohexane, toluene or chlorobenzene, or if the compounds of formula (IX) bear a sulphonic acid group in water in the case of thiol compounds. An excess of the thiol compound may be employed as solvent. Suitable solvents for the reaction with hydroxy compounds include pyridine, a mixture of pyridine bases, quinoline, nitrobenzene, 2,6-di-tert. butyl-4-methylphenol, or a excess of the hydroxy compound itself. Any water present or formed prior to or during the reaction is eliminated. For the reaction of the bromine atom in the 2-position it may be of advantage to add a copper catalyst, e.g., copper-I-chloride, especially in the case of thiol compounds. The reaction products are precipitated in the known way, e.g., by dilution with a lower alcohol or, if water-soluble or alkali-soluble hydroxyl or thiol compounds have been employed, with water or with alkali hydroxide solutions, and then filtered off with suction, washed and dried.

The treatment with sulfphur trioxide (in gaseous form diluted with air or as an adduct on pyrifine or dioxane, or with chlorosulphonic acid can be carried out in an inert solvent such as chloroform, 1,2-dichloroethane or nitrobenzene at temperatures of 0° to 50°C or preferably at 15°-30°C. Normally however concentrated sulphuric acid of about 96–100 % strength is employed, or oleum with an $SO_3$ content of up to about 15 % for reaction at the aforestated temperatures. Under these conditions the benzene nuclei are sulphonated and the aliphatic hydroxyl groups sulphated. For sulphation concentrated sulphuric acid can be employed at 10°-20°C, whilst for sulphonation at the same temperature it is advisable to employ oleum with an $SO_3$ content of 5–10 %. For converting the hydroxyalkyl groups into sulphatoalkyl groups aminosulphonic acid can also be employed with advantage, e.g., at 100°-150°C. The sulphonated or sulphated compound can be isolated by running the solutions into water or into a salt solution, with the further addition of salt if necessary.

The final compounds are water-soluble dyes containing at least one $-SO_3H$ group and are employed for the exhaustion dyeing, pad dyeing and printing of wool, silk, hair fibres, polyamide and polyurethane fibres and leather. The dyeings and prints obtained on these material are of brilliant shade and have good to very good wet fastness properties (washing, milling, perspiration, water, sea water), with good rubbing and dry cleaning fastness. On polyamide fibres the light fastness is very good and better than on wool.

In the Examples the parts and percentages are by weight and the temperatures in degrees centigrade.

EXAMPLE 1

A mixture of 400 parts of water, 40.4 parts of sodium 1-amino-4-bromanthraquinone-2-sulphonate, 20 parts of 1-amino-3,5,5-trimethylcyclohexane, 15 parts of 30 % sodium hydroxide solution, 50 parts of ethanol and 1 part of copper powder is stirred for 5 hours at 65°. The blue dye formed is isolated and dried in the normal way. It is of formula (VI). From aqueous solution it gives dyeings of brilliant redish blue shade on polyamide fibres which have very good wet fastness properties and outstandingly good light fastness.

This new dye has far better wet fastness properties on synthetic polyamide fibres than the known commercial dye which bears an unsubstituted cyclohexylamino group in the 4-position.

The same dye can obtained by the following alternative route. A mixture of 38.1 parts of 1-amino-2,4-dibromanthraquinone, 160 parts of 3,5,5-trimethylcyclohexylamine, 25 parts of anhydrous potassium acetate and 0.5 part of copper-I-chloride is maintained at 110°-120° until the starting material has disappeared. The mixture is then diluted with methanol and allowed to cool to room temperature. The precipitate is filtered off, washed successively with methanol and water and dried. It may be recrystallized if desired, after which 10 parts are mixed with 50 part of phenol and 20 parts of 50 % potassium sulphite solution in an autoclave and reacted at 130° for 16 hours. The phenol is distilled off with water vapour and the dye salted out, filtered off with suction and washed with salt solution. If necessary it is then dissolved in hot water, filtered while hot to free it from water insoluble impurities and salted out, on which it is dried.

DYEING EXAMPLE

A solution of 2 parts of the dye of Example 1 in 6000 parts of water at 40° is prepared and to it is added 4 parts of ammonium sulphate. 100 parts of a nylon 66 yarn are entered into the dyebath, which is then brought to the boil in 30 minutes and held at this temperature for 1 hour. Subsequently the yarn is rinsed and dried. It is dyed in a fast, brilliant reddish blue shade.

The following Table I details further dyes of formula

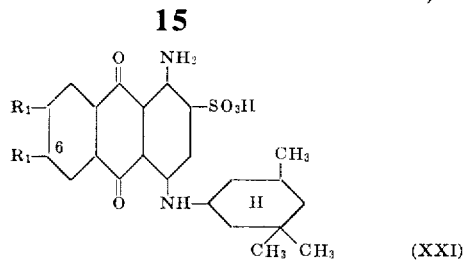

(XXI)

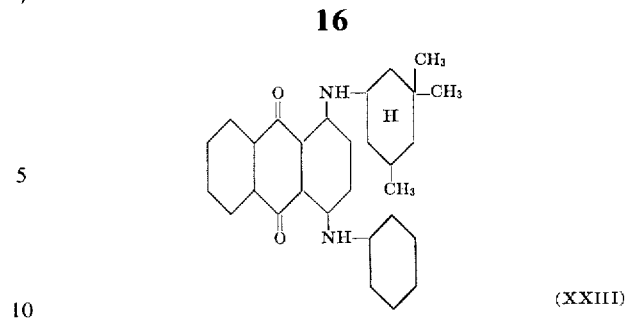

(XXIII)

which are specified by the substituents $R_1$ present in the 6 and 7 positions and by the shade of the dyeings on wool or synthetic polyamide fibres.

TABLE 1

| Example No. | $R_1$ in position 6 | $R_1$ in position 7 | Shade of dyeings |
|---|---|---|---|
| 2 | Cl | H | reddish blue |
| 3 | H | Cl | do. |
| 4 | Br | H | do. |
| 5 | F | H | do. |
| 6 | —SO$_3$H | H | blue |
| 7 | Cl | Cl | reddish blue |

EXAMPLE 8

46.4 parts of the sodium salt of the dye of Example 1 are dissolved in 600 parts of water at 60°, with the addition of 46.5 parts of 30 % sodium hydroxide solution. Over 1 hour 19 parts of sodium dithionite are sprinkled into the solution. After a further hour at 60° the desulphonation reaction is complete. The water-insoluble compound is filtered off, washed with hot water until of neutral reaction and dried. It is a dark violet powder which on recrystallization from toluene melts at 204–205°.

It has the formula and its melting point (subsequent to recrystallization from toluene and ethyl alcohol) is at 183–184°. This water insoluble dye can be sulphonated in the benzene nucleus by the normal methods, e.g. by treatment with five times its amount of 10 % oleum at 5°–10°. Sulphonation yields a blue water soluble dye which gives dyeings of attractive blue shade on wool and synthetic polyamide fibres having excellent light and wet fastness properties.

By employing in place of bromobenzene the equivalent amount of 4-ethoxy-1-bromobenzene a dye base with melting point 191°–192° is obtained. The sulphonated derivative of this gives brilliant greenish blue dyeings on synthetic polyamide fibres which have excellent light and very good wet fastness properties (washing, milling, perspiration, water, sea water), together with very good rubbing and dry cleaning fastness. This dye is of greater brilliance and is faster to washing and perspiration than the analogous dye bearing a cyclohexylamino group.

When other bromobenzenes are employed, the results are as follows:

Table 2

| Example No. | Bromobenzene | Melting point of dye base | Shade of aqueous solution of the sulphonated derivative |
|---|---|---|---|
| 9 | 1-bromo-4-methylbenzene | 174 – 175° | blue |
| 10 | 1-bromo-2,4-dimethylbenzene | 178 – 179° | reddish blue |
| 11 | 1-bromo-2,4,6-trimethylbenzene | 176 – 177° | do. |

EXAMPLE 12

A solution of 8 parts of iodine in 150 parts of benzyl alcohol is prepared at 60° and while the temperature is being raised to 100°. 72.4 parts of 1-amino-4-(3',5',5'-trimethylcyclohexylamino)-anthraquinone are added. The mixture is stirred for 6 hours at 100°, cooled to 80° and diluted with 300 parts of isopropyl alcohol. The resulting 1-benzylamino-4-(3',5',5'-trimethylcyclohexylamino)-anthraquinone settles out and is filtered off, washed with isopropyl alcohol and then with water and dried at 100°. It has the formula

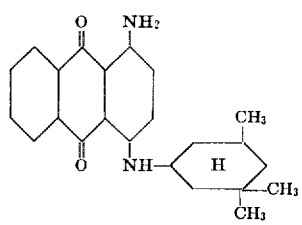

(XXII)

A mixture of 36.2 parts of the 1-amino-4-(3',5',5',-trimethylcyclohexamino)-anthraquinone thus prepared, 75 parts of bromobenzene, 15 parts of anhydrous sodium carbonate and 2 parts of cuprous chloride is reacted at 135–140° for 4 hours. On cooling to 100° the mixture is diluted with 150 parts of ethyl alcohol, causing precipitation of the blue dye formed. This is filtered off, washed with ethyl alcohol and water and dried. It has the structure:

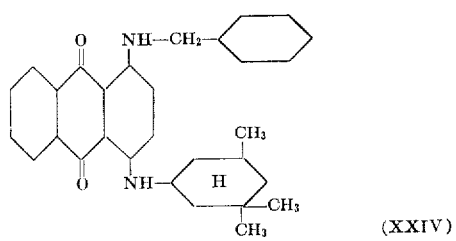

(XXIV)

45.2 parts of this dye base are dissolved in 135 parts of 100 % sulphuric acid and 80 parts of 25 % oleum at 5-8°. The sulphonation reaction ru;ns its course in 6 hours, following which the mixture is run into a mixture of 150 parts of water, 400 parts of 28 % aqueous sodium chloride solution and 250 parts of ice. The dye settles out. It is filtered off, washed with 10 % sodium chloride solution and dried at 100°. The dye thus formed dyes synthetic polyamide fibres in brilliant blue shades which are fast to light and wet treatments.

The dyeings are faster to wet tests than comparable dyeings of the dye containing an unsubstituted cyclohexylamino group.

EXAMPLE 13

72.4 parts of 1-amino-4-(3',5',5'-trimethylcyclohexylamino)-anthraquinone are dissolved in 160 parts of benzyl chloride at room temperature, and after the addition of 18 parts of sodium bicarbonate the temperature is increased to 100°. The condensation reaction takes 10 hours. After this time the mixture is cooled to 60° and the dye base precipitated with 300 parts of isopropyl alcohol. On sulphonation a dye identical with that of Example 12 is obtained.

EXAMPLE 14

36.2 parts of 1-amino-4-(3',5',5'-trimethylcyclohexylamino)-anthraquinone are dissolved at 70° in a mixture of 90 parts of 55% sulphuric acid and 14 parts of acrylic acid, and the solution is stirred for a further 4 hours at this temperature. It is then run into 500 parts of water at 60°. The crystalline precipitate is filtered off and washed with hot water until the waste water runs virtually colourless and is of almost neutral reaction, on which it is dried at 100°.

43.4 parts of 1-(2'-carboxyethylamino)-4-(3'',5'',5''-trimethylcyclohexylamino)-anthraquinone are dissolved in 150 parts of aniline at room temperature. 14 parts of phosphorus trichloride are dropped in at 40°. Subsequently the temperature of the reaction mixture is increased to 60° and it is held at 60-65° for 4 hours, after which time 160 parts of methyl alcohol are added which causes the dye base to settle out in crystalline form. It is filtered off, washed with methyl alcohol and then with water and dried at 100°. The blue crystalline product is of formula

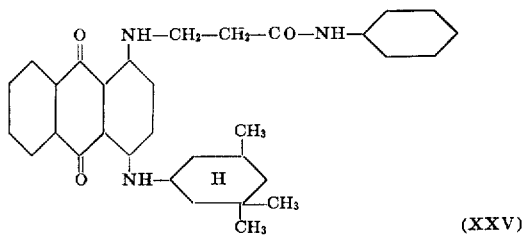

(XXV)

50.9 parts of this dye base are dissolved at 16° in 100 parts of 100% sulphuric acid and 60 parts of 25% oleum. Sulphonation is complete in 5 hours. The solution is then run into a mixture of 150 parts of water, 400 parts of 28% aqueous sodium chloride solution and 250 parts of ice. The dye settles out and is filtered off, washed with 10% sodium chloride solution and dried at 100°. A brilliant blue dye is obtained which gives dyeings of high light and wet fastness on synthetic polyamide fibres.

The acrylic acid employed in this example can be replaced by the equivalent amount of 2-methylacrylic acid, in which case it is preferable to carry out the reaction in 96% sulphuric acid at 95°-100° in the presence of 3-5% of 100% phosphoric acid.

EXAMPLE 15

A mixture of 23.1 parts of 1-(4'-methyl-4'-phenylpentyl-2'-amino)-4-bromoanthraquinone, 0.1 part of copper powder and 42 parts of 3,5,5-trimethylcyclohexylamine is reacted at 80°-85° for 48 hours with stirring. On cooling to 60° 120 parts of methanol are added dropwise. The precipitate formed is filtered off at 20°-25°, washed with methanol and dried. It is of formula

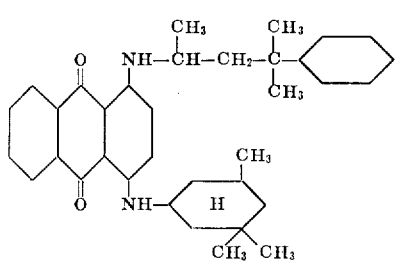

(XXVI)

10 parts of this dye base are dissolved in 40 parts of 100% sulphuric acid at 25° and the solution is stirred until no further starting material is present. It is then discharged onto ice and the precipitate thus formed is filtered off, washed with 10% sodium chloride solution and dried. A blue powder is obtained which dyes wool and synthetic polyamide fibres in brilliant greenish blue shades which have good light and wet fastness properties.

EXAMPLE 16

42.7 parts of 1-(3',3',5'-trimethylcyclohexylamino)-anthraquinone-6-sulphonic acid are dissolved at 20°-25° in 220 parts of 100% sulphuric acid, with the addition of 16 parts of bromine. The temperature is slowly increased to 75° and this temperature held for about 16 hours. On cooling the reaction mixture is run onto 650 parts of ice. The precipitated 1-(3',3',5'-trimethylcyclohexylamino)-4-bromathraquinone-6-sulphonic acid is filtered off, washed with water until of neutral reaction and dried.

25.3 parts of this compound are suspended in 300 parts of water, on which 15 parts of 30% sodium hydroxide solution, 1 part of copper-I-chloride, 20 parts of isopropyl alcohol and 15 parts of 3,5,5-trimethylcyclohexylamine are added. The mixture is maintained at 65°-70° until the starting compound has disappeared. It is then run into a mixture of 100 parts of water and 15 parts of 30% hydrochloric acid to form a suspension. This is raised to 80° and the reaction product is filtered at this temperature and washed with acidified water. It is then suspended in 500 parts of water, the suspension raised to 80° and neutralised with sodium carbonate, then the final dye is salted out and isolated.

The 15 parts of 3,5,5-trimethylcyclohexylamine can be replaced by 10 parts of cyclohexylamine or 6 parts of isopropylamine, in which case the reaction can be effected without isopropyl alcohol. The dyes thus obtained give brilliant dyeings of good light and wet fastness on synthetic polyamide fibres.

An aromatic amine, e.g., 9 parts of aminobenezene or 14 parts of 1-amino-4-acetylaminobenzene, can be employed for the condensation reaction, in which case 9 parts of sodium carbonate are ussed as acid-binding agent and the isopropyl alcohol omitted. The resulting dyes give brilliant blue shades of high light and wet fastness on synthetic polyamide fibres.

This same condensation reaction can be carried out with 18 parts of sodium 1-aminobenzene-3-sulphonate to give a wool dye.

The 1-(3',5',5'-trimethylcyclohexylamino)-anthraquinone- 6-sulphonic acid employed in the foregoing as starting product is prepared as follows.

A mixture of 108 parts of sodium anthraquinone-1,6-disulphonate, 50 parts of 3,5,5-trimethylcyclohexylamine, 40 parts of sodium 3-nitrobenzenesulphonate and 1.5 parts of copper sulphate in 360 parts of water is reacted in an autoclave for 36 hours at 160°. On cooling the sodium salt of the 1-(3',5',5'-trimethylcyclohexylamino)-anthraquinone-6-sulphonic acid is salted out, filtered off with suction and washed with sodium chloride solution until the filtrate runs colourless. The filter residue is dissolved in 3600 parts of water at 70°, the solution acidified with hydrochloric acid (red to Congo paper) and the product then filtered off, washed with acidified water until the waste water runs colourless, and dried. The 1-(3',5',5'-trimethylcyclohexylamino)-anthraquinone-6-sulphonic acid is obtained in the form of red crystals.

EXAMPLE 17

173.5 Parts (0.5 mole) of 1-(3',5',5'-trimethylcyclohexylamino)-anthraquinone are brominated in the 4-position by the method given in Example 16. 42.7 Parts of the resulting 1-(3,5'5'-trimethylcyclohexylamino)-4-bromanthraquinone are entered into 250 parts of acetic anhydride. After the addition of 2 parts of anhydrous zinc chloride the mixture is raised to 90°–100° and held at this temperature until the starting compound has disappeared. On cooling the mixture is poured slowly into 1,000 parts of water with vigorous stirring.

The temperature is kept below 30° by external cooling and stirring is continued until the acetic anhydride is completely saponified to acetic acid. At this point the precipitated product is filtered off with suction, washed with water and dried.

23.5 Parts of the 1-(N-acetyl-N-3',5',5'-trimethylcyclohexylamino)-4-bromanthraquinone thus obtained are added to 19 parts of 1-phenyl-3-aminobutane and the mixture is reacted for 20 hours at 110° with stirring. It is then run into a mixture of 200 parts of ice, 170 parts of water and 30 parts of 30% hydrochloric acid. The precipitated resinous compound is separated and entered in portions into 175 parts of 65% sulphuric acid. The hydrolyzing mixture is maintained at 60°–70° until the red acyl compound is no longer indicated, on which it is run onto ice. The blue dye base can be recrystallized in n-butanol if desired and is then sulphonated with 5–10% oleum at 20°–30°. The dye thus obtained gives blue dyeings of good light and wet fastness on synthetic polyamide fibres.

The 1-(3',5',5'-trimethylcyclohexylamino)-anthraquinone can be prepared as follows. A mixture of 242.5 parts (1 mole) of 1-chloranthraquinone and 1,000 parts of 3,5,5-trimethylcyclohexylamine is reacted at 100° until no further 1-chloranthraquinone is indicated. The excess amine is driven off with water vapour and the residue introduced into 1,000 parts of water with the addition of sufficient concentrated hydrochloric acid to render the solution strongly acid. After stirring at 80° the product is filtered off with suction, washed with water until neutral and dried.

EXAMPLE 18

A mixture of 21.4 parts of 1-(3',5',5'-trimethylcyclohexylamino)-4-bromanthraquinone, 20 parts of 1-phenyl-3-aminobutane, 5 parts of anhydrous potassium acetate, 0.1 part of copper-I-chloride, 0.1 part of water and 3 parts of 2-ethoxyethanol is reacted at 110° for 48 hours with stirring. After the addition of 60 parts of n-butanol the mixture is allowed to cool. The dye base is then filtered off with suction, washed with butanol and then methanol, recrystallized in n-butanol and dried. The sulphonated product is identical with the dye of Example 17.

The 1-(3',5',5'-trimethylcyclohexylamino)-4-bromanthraquinone can be replaced by 1-(3',5',5'-trimethylcyclohexylamino)-4-chloranthraquinone, prepared by chlorination of 1-(3',5',5'-trimethylcyclohexylamino)-anthraquinone with sulphuryl chloride in nitrobenzene with which the same dye is obtained.

EXAMPLE 19

10 parts of 1-cyclohexylamino-4-bromanthraquinone-6-sulphonic acid are entered into a mixture of 200 parts of water, 20 parts of ethyl alcohol, 20 parts of 3,5,5-trimethylcyclohexylamine, 0.5 part of copper bronze and 7 parts of 30% sodium hydroxide solution. The reaction mixture is maintained at 60°–70° until no further starting material is present. The resulting compound is worked up as described in Example 16 to give a dye which is isomeric to the dye referred to in the third paragraph of Example 16 and have very similar properties to it.

The use of 1-phenylamino-4-bromanthraquinone-6-sulphonic in place of 1-cyclohexylamino-4-bromanthraquinone-6-sulphonic acid results in a similar dye.

EXAMPLE 20

A mixture of 23.5 parts of 1-(N-acetyl-N-3',5',5'-trimethylcyclohexylamino)-4-bromanthraquinone, 0.01 part of copper-I-oxide, 5 parts of potassium acetate, 17.8 parts of 2-amino-1-butanol and 50 parts of n-butanol is reacted for 24 hours at 115°C with stirring. After the addition of 75 parts of methanol at 60° the temperature is allowed to fall to 20°–25°. The product settles out and is filtered off, washed with methanol and dried. 20 Parts of the product are dissolved in 100 parts of 80% sulphuric acid and the solution is stirred at 60° for 8 hours, after which it is discharged onto ice. The precipitated dye base is filtered off, washed neutral with water and dried at 60°. 10 Parts of this dye base are sulphated in 40 parts of 100% sulphuric acid at room temperature. Subsequently the mixture is run onto ice and the precipitate filtered off, washed with 10% sodium chloride solution and dried. A powder is obtained which dyes wool and synthetic polyamide fibres in brilliant blue shades having good light and wet fastness properties.

EXAMPLE 21

The procedure of Example 20 is followed, employing in place of 2-amino-1-butanol 37 parts of 2-benzylcyclohexylamine and sulphonating the resulting dye base with 5–10% oleum. The product is a blue dye which gives dyeings of good light and wet fastness on synthetic polyamide fibres.

EXAMPLE 22

45 parts of 1-(2'-phenylaminocarbonyl-ethylamino)-4-bromanthraquinone are added to a mixture of 150 parts of 3,5,5-trimethylcyclohexylamine, 7 parts of anhydrous sodium carbonate and 0.5 part of copper-I-oxide and reacted at 130°–135° until no further starting material is indicated. The dye base formed is isolated in the normal way and sulphonated with 7 times its amount of 3% oleum at 18°–20° to yield a dye which is identical with that of Example 14.

EXAMPLE 23

33.4 parts of 1,4-dihydroxy-5-hydroxyethylamino-8-chloranthraquinone and 20 parts of anhydrous sodium carbonate are added to 100 parts of nitrobenzene and the temperature raised to 150°. Over the following hour 150 parts of 3,5,5-trimethylcyclohexylamine are added, the temperature being kept constant at 150°–155° until no further starting material is indicated. Methanol is added to the reaction mixture at 60°, on which it is cooled to 0° and the product filtered off with suction, washed with methanol and water and dried. On sulphation in accordance with the procedure of Example 20, the product dyes wool and synthetic polyamide fibres in blue-green shades of good light and wet fastness.

EXAMPLE 24

When the 1,4-dihydroxy-5-hydroxyethylamino-8-chloranthraquinone employed in the preceding Example is replaced by 1,4-dihydroxy-5-(4'-methylphenylamino)-8-chloranthraquinone and sulphonation is carried out in 5% oleum at 20°–25°, a dye giving blue-green dyeings is obtained.

The same dye can be arrived at by reacting 30 parts of 1,4-dihydroxy-5,8-dichloranthraquinone with 25 parts of 3,5,5-trimethylcyclohexylamine in 240 parts of nitrobenzene at 150° until the starting products are no longer indicated. The reaction mixture is then treated in the normal way and 12 parts of the isolated 1,4-dihydroxy-5-(3',5',5-trimethylcyclohexylamino)-8-chloranthraquinone are reacted with 6 parts of anhydrous sodium acetate and 75 parts of 4-methyl-1-aminobenzene at 170°–175°. On completion of the reaction the dye base is sulphonated.

EXAMPLE 25

A mixture of 10 parts of 1,4-dihydroxyanthraquinone-6-sulphonic acid, 40 parts of 3,5,5-trimethylcyclohexylamine, 70 parts of 95% ethanol, 0.8 part of zinc dust and 1,1 parts of 100% acetic acid is reacted at 80° under a nitrogen atmosphere until after about 4 to 6 hours no further starting material is indicated. A jet of air is then directed through the mixture to reoxidize the proportion of dye which is still in the leuco form. The dye is then isolated and purified by the normal method. It is of blue colour and gives dyeings of bright blue shade on wool and synthetic polyamide fibres which have very good light and wet fastness. Instead of forming the leuco compound of the 1,4-dihydroxyanthraquinone-6-sulphonic acid in the reaction mixture, one can start from the pure leuco-1,4-dihydroxyanthraquinone-6-sulphonic acid or from a mixture of 1,4-dihydroxyanthraquinone-6-sulphonic acid and its leuco compound.

In place of 95% ethanol another alcohol, e.g., n-propanol or n-butanol, or an alcohol-water mixture, e.g., 80 parts of secondary butanol and 20 parts of water, can be employed with equally good success.

EXAMPLE 26

A solution of 5.5 parts of potassium hydroxide in 200 parts of glycerol is prepared at 100°–110° with vigorous stirring, and 23.2 parts of sodium 1-amino-4-(3',5',5'-trimethylcyclohexylamino)-anthraquinone-2-sulphonate and 12 parts of sodium 3-nitrobenzene-1-sulphonate are added to it. The solution is reacted for 8 hours at 120°–125° with stirring, after which it is run into 800 parts of water and acidified with hydrochloric acid. The product settles out and is filtered off, washed with water until of neutral reaction and dried.

10 parts of the resulting dye base are stirred in 40 parts of 100% sulphuric acid at 15°–20° until a sample is completely soluble in water, on which the dye is isolated in the usual way. Its dyeings on wool and synthetic polyamide fibres are of brilliant violet shade and have good light and wet fastness.

The 23.2 parts of sodium 1-amino-4-(3',5',5'-trimethylcyclohexylamino)-anthraquinone-2-sulphonate can be replaced by 28.3 parts of the analogous 2,6-disulphonate, in which case a violet dye for wool is obtained.

EXAMPLE 27

At 100°–110° 7.5 parts of potassium hydroxide are dissolved in 100 parts of phenol, after which 18 parts of sodium 1-amino-4-(3',5',5'-trimethylcyclohexylamino)-anthraquinone-2-sulphonate are added. The temperature is increased to 170° and this temperature maintained until a sample is insoluble in water. The mixture is then allowed to cool to 100°, 150 parts of methanol are added and it is allowed to cool further to 20°. The dye base is filtered off with suction, washed with methanol and then with water and dried. 10 parts of the dye base are entered into 45 parts of 5–10% oleum and stirred at 15°–25° until fully water soluble. The sulphonated dye is worked up in the normal way. On wool and synthetic polyamide fibres it gives dyeings of brilliant violet shade having good light and wet fastness.

The same dye can be obtained by reacting 16 parts of 1-amino-2-bromo-4-(3',5',5'-trimethylcyclohexylamino)-anthraquinone in a mixture of 16 parts of phenol, 50 parts of nitrobenzene and 7.5 parts of potassium hydroxide at 150° until the starting products have disappeared, and continuing as stated in the foregoing.

EXAMPLE 28

A mixture of 23.2 parts of sodium 1-amino-4-(3',5',5'-trimethylcyclohexylamino)-anthraquinone-2-sulphonate, 13.5 parts of 30% sodium hydroxide solution, 100 parts of water and 22 parts of 4-methyl-1-mercaptobenzene is reacted for 24 hours at 95°–100° with reflux. After the addition of 120 parts of ethanol the reaction mixture is allowed to cool and the product, having settled out, is filtered off, washed with ethanol and water and dried.

10 parts of the dye base thus formed are dissolved in 50 parts of 100% sulphuric acid at 15°–20°. 15 parts of 25% oleum are dropped in and the mixture stirred until a sample is completely soluble in water. It is run onto ice and the precipitate is filtered off with suction and introduced again into 200 parts of water. The suspension is neutralized, the dye salted out, filtered off with suction, washed, dried and ground. It is obtained as a dark powder which gives dyeings of greenish blue shade on wool and synthetic polyamide fibres which are fast to light and wet treatments.

The same dye can be obtained by reacting 11.1 parts of 1-amino-2-bromo-4-(3',5',5'-trimethylcyclohexylamino)-anthraquinone 50 parts of 2-(2'-methoxyethoxy)-ethanol, 2 parts of anhydrous sodium carbonate and 5 parts of 4-methyl-1-mercaptobenzene at 80°–85° until no further starting material is present, on which the product is precipitated with 40 parts of ethanol, filtered off with suction, washed with ethanol and water and dried. It is sulphonated as described in the foregoing.

The following Table 3 details further dyes of formula

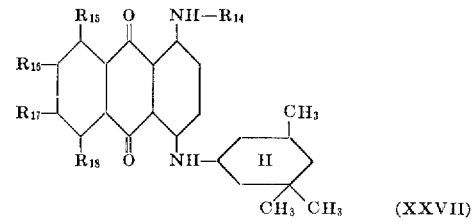

(XXVII)

which give dyeings of greenish blue to reddish blue shade on wool and synthetic polyamide fibres and are characterized in the Table by the meanings of the substituents $R_{14}$ and $R_{18}$.

Table 3

| Example | $R_{14}$ | $R_{15}$ | $R_{16}$ | $R_{17}$ | $R_{18}$ |
|---|---|---|---|---|---|
| 29 | Sulpho-3-methylphenyl | H | H | H | H |
| 30 | sulpho-4-chlorophenyl | H | H | H | H |
| 31 | sulpho-4-methoxyphenyl | H | H | H | H |
| 32 | sulpho-2,5-dimethylphenyl | H | H | H | H |
| 33 | sulpho-2-methoxyphenyl | H | H | H | H |
| 34 | sulpho-2-methoxy-5-methylphenyl | H | H | H | H |
| 35 | sulphophenyl | OH | H | H | OH |
| 36 | do. | OH | H | H | $NH_2$ |
| 37 | sulpho-4-methylphenyl | $NH_2$ | H | H | OH |
| 38 | do. | $NH_2$ | H | H | $NH_2$ |
| 39 | sulph-4-acetylaminophenyl | H | Cl | H | H |
| 40 | sulpho-4-propionylaminophenyl | H | H | H | H |
| 41 | sulpho-4-bromophenyl | H | $SO_3H$ | H | H |
| 42 | sulph-4-n-butylphenyl | H | $SO_3H$ | H | H |
| 43 | do. | H | H | H | H |
| 44 | sulpho-4-isopropylphenyl | H | H | H | H |
| 45 | sulpho-4-ethylphenyl | H | H | H | H |
| 46 | sulpho-4-tert.amylphenyl | H | H | H | H |
| 47 | sulpho-4-ethoxycarbonylaminophenyl | H | H | H | H |
| 48 | 4-methylphenyl | H | $SO_3H$ | H | H |
| 49 | 4-methoxyphenyl | H | $SO_3H$ | H | H |
| 50 | 2-sulphatoethyl | H | H | H | H |
| 51 | 2-sulphatopropyl-1 | H | H | H | H |
| 52 | 1-sulphatopropyl-2 | H | H | H | H |
| 53 | 1-sulphatobutyl-2 | H | H | H | H |
| 54 | 4-sulphatobutyl-2 | H | H | H | H |
| 55 | 3-sulphato-2-hydroxypropyl-1 | H | H | H | H |
| 56 | do. | OH | H | H | OH |
| 57 | 2-sulphato-propyl-1 | $NH_2$ | H | H | $NH_2$ |
| 58 | 2-sulphato-ethyl | $NH_2$ | H | H | OH |
| 59 | do. | H | Cl | H | H |
| 60 | do. | H | H | Cl | H |
| 61 | 4-(sulphophenyl)-4-methyl-pentyl-2 | H | H | H | H |
| 62 | do. | OH | H | H | OH |
| 63 | do. | H | $SO_3H$ | H | H |
| 64 | 4-(sulphophenyl)-butyl-2- | H | H | H | H |
| 65 | 6-(sulphophenyl)-2-methyl-hexyl-4 | H | H | H | H |
| 66 | do. | H | $SO_3H$ | H | H |
| 67 | do. | H | H | $SO_3H$ | H |
| 68 | do. | OH | H | H | OH |
| 69 | do. | $NH_2$ | H | H | $NH_2$ |
| 70 | 4-(sulphophenyl)-butyl-2 | $NH_2$ | H | H | OH |
| 71 | do. | H | Cl | H | H |
| 72 | sulphobenzyl | H | Cl | H | H |
| 73 | do. | OH | H | H | OH |
| 74 | do. | $NH_2$ | H | H | $NH_2$ |
| 75 | 2-(sulphophenylethyl)-cyclohexyl | H | H | H | H |
| 76 | 2-(sulpho-4'-methylbenzyl)-cyclohexyl | H | H | H | H |
| 77 | 2-(sulpho-2',4'-dimethylbenzyl)-cyclohexyl | H | H | H | H |
| 78 | 2-(3'sulpho-2',4',6'-trimethylbenzyl)-cyclohexyl | H | H | H | H |
| 79 | 2-(sulpho-4'-methoxybenzyl)-cyclohexyl | H | H | H | H |
| 80 | 2-(sulpho-4'-ethoxybenzyl)-cyclohexyl | H | H | H | H |
| 81 | 2-(sulpho-2',4'-dimethoxybenzyl)-cyclohexyl | H | H | H | H |

Table 3 – Continued

| Example | R₁₄ | R₁₅ | R₁₆ | R₁₇ | R₁₈ |
|---|---|---|---|---|---|
| 82 | 2-(sulphobenzyl)-4-methyl-cyclohexyl | H | H | H | H |
| 83 | do. | H | SO₃H | H | H |
| 84 | 2-(sulphobenzyl)-4-ethyl-cyclohexyl | H | H | H | H |
| 85 | 2-(sulphobenzyl)-4-tert.-butyl-cyclohexyl | H | SO₃H | H | H |
| 86 | 2-(sulphobenzyl)-4-tert.amyl-cyclohexyl | H | SO₃H | H | H |
| 87 | 2-(sulphobenzyl)-4-isooctyl-cyclohexyl | H | SO₃H | H | H |
| 88 | 2-methylphenyl | H | SO₃H | H | H |
| 89 | 3-chlorophenyl | H | SO₃H | H | H |
| 90 | 4-methoxyphenyl | H | H | SO₃H | H |
| 91 | 4-acetylaminophenyl | H | SO₃H | H | H |
| 92 | 3-acetylaminophenyl | H | SO₃H | H | H |
| 93 | 2,4-dimethylphenyl | H | SO₃H | H | H |
| 94 | 2,4,6-trimethylphenyl | H | SO₃H | H | H |
| 95 | 2-methoxy-5-methylphenyl | H | SO₃H | H | H |

The following Table 4 gives details of further dyes of formula

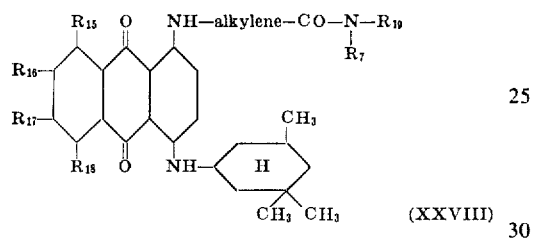

(XXVIII)

which give greenish blue to reddish blue dyeings on wool and synthetic polyamide fibres and are distinguished by the meanings of "alkylene," $R_7$ and $R_{15}$ to $R_{19}$.

TABLE 4

| Ex. No. | Alkylene | R₇ | R₁₉ | R₁₅ | R₁₆ | R₁₇ | R₁₈ |
|---|---|---|---|---|---|---|---|
| 96 | —CH₂— | H | Sulphophenyl | H | H | H | H |
| 97 | —CH₂— | CH₃ | do | H | H | H | H |
| 98 | —CH₂— | C₂H₅ | do | H | H | H | H |
| 99 | —CH₂— | H | do | H | Cl | H | H |
| 100 | —CH₂— | H | do | OH | H | H | OH |
| 101 | —CH₂— | H | do | NH₂ | H | H | NH₂ |
| 102 | —CH₂— | H | do | NH₂ | H | H | OH |
| 103 | —CH₂— | H | Sulpho-4-methylphenyl | H | H | H | H |
| 104 | —CH₂— | H | Sulpho-4-tert. butylphenyl | H | SO₃H | H | H |
| 105 | —CH₂— | H | Sulpho-4-isopropylphenyl | H | H | H | H |
| 106 | —CH₂— | H | Sulpho-4-tert. amylphenyl | H | SO₃H | H | H |
| 107 | —CH₂— | H | Sulpho-2,4-dimethylphenyl | H | H | H | H |
| 108 | —CH₂— | H | 3-sulpho-2,4,6-trimethylphenyl | H | H | SO₃H | H |
| 109 | —CH₂— | H | Sulpho-4-methoxyphenyl | H | H | H | H |
| 110 | —CH₂— | H | Sulpho-2-methoxy-5-methylphenyl | H | H | H | H |
| 111 | —CH₂— | H | Sulpho-3-chlorophenyl | H | H | H | H |
| 112 | —CH₂— | H | Sulpho-4-acetylaminophenyl | H | H | H | H |
| 113 | —CH₂— | H | Sulpho-4-ethoxycarbonyl aminophenyl | H | H | H | H |
| 114 | —CH₂—CH₂— | CH₃ | Sulphophenyl | H | H | H | H |
| 115 | —CH₂—CH₂— | C₂H₅ | do | H | H | H | H |
| 116 | —CH₂—CH₂— | H | do | H | Cl | H | H |
| 117 | —CH₂—CH₂— | H | do | H | H | Cl | H |
| 118 | —CH₂—CH₂— | H | do | H | SO₃H | H | H |
| 119 | —CH₂—CH₂— | H | Sulpho-2-methylphenyl | H | H | H | H |
| 120 | —CH₂—CH₂— | H | Sulpho-3-methylphenyl | H | H | H | H |
| 121 | —CH₂—CH₂— | H | Sulpho-4-methylphenyl | H | H | H | H |
| 122 | —CH₂—CH₂— | H | Sulpho-4-ethylphenyl | H | H | H | H |
| 123 | —CH₂—CH₂— | H | Sulpho-2,4-dimethylphenyl | H | H | H | H |
| 124 | —CH₂—CH₂— | H | Sulpho-2,5-dimethylphenyl | H | H | H | H |
| 125 | —CH₂—CH₂— | H | Sulpho-2,6-dimethylphenyl | H | H | H | H |
| 126 | —CH₂—CH₂— | H | Sulpho-2,4,6-trimethylphenyl | H | H | H | H |
| 127 | —CH₂—CH₂— | H | Sulpho-2,4,5-trimethylphenyl | H | H | H | H |
| 128 | —CH₂—CH₂— | C₂H₅ | Sulpho-3-methylphenyl | H | H | H | H |
| 129 | —CH₂—CH₂— | C₂H₅ | Sulpho-4-methoxyphenyl | H | H | H | H |
| 130 | —CH₂—CH₂— | H | do | H | H | H | H |
| 131 | —CH₂—CH₂— | H | Sulpho-2-methoxyphenyl | H | H | H | H |
| 132 | —CH₂—CH₂— | H | Sulpho-4-chlorophenyl | H | H | H | H |
| 133 | —CH₂—CH₂— | H | Sulpho-2-chlorophenyl | H | H | H | H |
| 134 | —CH₂—CH₂— | H | Sulpho-4-ethoxyphenyl | H | SO₃H | H | H |
| 135 | —CH₂—CH₂— | H | Sulpho-4-n-butoxyphenyl | H | H | SO₃H | H |
| 136 | —CH₂—CH₂— | H | Sulpho-4-n-amylphenyl | H | SO₃H | H | H |
| 137 | —CH₂—CH₂— | H | Sulpho-4-n-butylphenyl | H | SO₃H | H | H |
| 138 | —CH₂—CH₂— | H | Sulpho-4-tert. butylphenyl | H | SO₃H | H | H |
| 139 | —CH₂—CH₂— | H | Sulpho-4-isopropylphenyl | H | SO₃H | H | H |
| 140 | —CH₂—CH₂— | H | Sulpho-2-methoxy-5-methylphenyl | H | H | H | H |
| 141 | —CH₂—CH₂— | H | Sulpho-2,5-dimethyoxphenyl | H | H | H | H |
| 142 | —CH₂—CH₂— | H | Sulpho-2,4-diethoxyphenyl | H | H | H | H |
| 143 | —CH₂—CH₂— | H | Sulpho-4-ethyl-2-methylphenyl | H | H | H | H |
| 144 | —CH₂—CH₂— | H | Sulpho-2-methyl-4,6-diethylphenyl | H | H | H | H |
| 145 | —CH₂—CH₂— | H | Sulpho-2,4-dimethyl-6-ethylphenyl | H | H | H | H |
| 146 | —CH₂—CH₂— | H | Sulpho-4-acetylaminophenyl | H | H | H | H |
| 147 | —CH₂—CH₂— | —CH₃ | Sulpho-4-acetylaminophenyl | H | H | H | H |
| 148 | —CH₂—CH₂— | H | Sulpho-4-propionylaminophenyl | H | H | H | H |
| 149 | —CH₂—CH₂— | H | Sulpho-4-butyrylaminophenyl | H | SO₃H | H | H |
| 150 | —CH₂—CH₂— | H | Sulpho-4-ethoxycarbonylaminophenyl | H | H | H | H |
| 151 | —CH₂—CH₂— | H | Sulph-4-methoxycarbonylaminophenyl | H | H | H | H |

TABLE 4—Continued

| Ex. No. | Alkylene | $R_7$ | $R_{10}$ | $R_{15}$ | $R_{16}$ | $R_{17}$ | $R_{18}$ |
|---|---|---|---|---|---|---|---|
| 152 | —CH—CH$_2$—<br>  \|<br>  CH$_3$ | H | Sulphophenyl | H | H | H | H |
| 153 | Same | CH$_3$ | do | H | H | H | H |
| 154 | —CH$_2$—CH—<br>        \|<br>        CH$_3$ | CH$_3$ | do | H | H | H | H |
| 155 | Same | H | Sulpho-4-methylphenyl | H | H | H | H |
| 156 | do | H | Sulphophenyl | H | Cl | H | H |
| 157 | do | H | do | H | H | Cl | H |
| 158 | —CH$_2$—CH$_2$— | H | do | OH | H | H | OH |
| 159 | —CH$_2$—CH$_2$— | H | do | NH$_2$ | H | H | OH |
| 159 | —CH$_2$—CH$_2$— | H | do | NH$_2$ | H | H | OH |
| 160 | —CH$_2$—CH$_2$— | H | do | NH$_2$ | H | H | NH$_2$ |
| 161 | —CH$_2$—CH$_2$— | CH$_3$ | do | OH | H | H | OH |
| 162 | —CH$_2$—CH$_2$— | H | Sulpho-4-methylphenyl | OH | H | H | OH |
| 163 | —CH$_2$—CH$_2$— | H | Sulpho-4-chlorophenyl | OH | H | H | OH |
| 164 | —CH$_2$—CH$_2$— | H | Sulpho-4-acetylaminophenyl | OH | H | H | OH |
| 165 | —CH$_2$—CH$_2$— | H | Sulpho-4-methoxyphenyl | OH | H | H | OH |

The following Table 5 specifies further dyes of formula

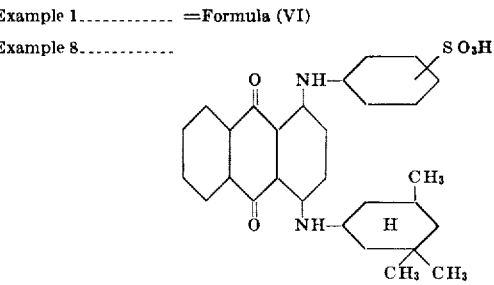

(XXIX), by stating the meanings of $R_{1(6)}$, $R_{1(7)}$, X and $R_2$. These dyes give dyeings of violet shade on wool and synthetic polyamide fibres (when X stands for —O—) or of greenish blue shade (when X stands for —S—).

| Ex. No. | $R_{1(6)}$ | $R_{1(7)}$ | X | $R_2$ |
|---|---|---|---|---|
| 166 | H | H | —O— | sulpho-4-methylphenyl |
| 167 | H | H | —S— | sulphophenyl |
| 168 | H | H | —O— | sulpho-2-methylphenyl |
| 169 | H | H | —O— | sulpho-4-methoxyphenyl |
| 170 | H | H | —O— | sulpho-4-ethoxyphenyl |
| 171 | H | H | —O— | sulpho-4-n-butoxyphenyl |
| 172 | Cl | H | —O— | sulphophenyl |
| 173 | H | Cl | —O— | Do. |
| 174 | F | H | —O— | Do. |
| 175 | Br | H | —O— | Do. |
| 176 | Cl | Cl | —O— | Do. |
| 177 | H | H | —O— | sulpho-4-isopropylphenyl |
| 178 | SO$_3$H | H | —O— | sulpho-4-tert.butylphenyl |
| 179 | SO$_3$H | H | —O— | sulpho-4-tert.amylphenyl |
| 180 | SO$_3$H | H | —O— | sulpho-4-tert.octylphenyl |
| 181 | SO$_3$H | H | —O— | sulpho-4-tert.nonylphenyl |
| 182 | H | H | —O— | sulpho-4-tert.butylphenyl |
| 183 | H | SO$_3$H | —O— | sulpho-4-tert.butylphenyl |
| 184 | H | H | —O— | sulpho-4-chlorophenyl |
| 185 | H | H | —O— | sulpho-4-fluorophenyl |
| 186 | H | H | —O— | sulpho-4-bromophenyl |
| 187 | H | H | —O— | sulphobenzyl |
| 188 | H | H | —S— | Do. |
| 189 | H | H | —O— | 2-(sulphophenyl)-ethyl |
| 190 | H | H | —O— | 2-sulphato-ethyl-1 |
| 191 | H | H | —S— | Do. |
| 192 | H | H | —S— | Do. |
| 192 | H | H | —O— | 2-sulphatopropyl-1 |
| 193 | H | H | —O— | 3-sulphatopropyl-1 |
| 194 | H | H | —O— | 3-sulphatopropyl-2 |
| 195 | H | H | —O— | 2-(2'-sulphato-ethoxy)-ethyl-1 |
| 196 | H | H | —O— | 2-[2'-(2''-sulphato-ethoxy)-ethoxy]-ethyl-1 |
| 197 | Cl | H | —O— | 3-sulphato-2-hydroxy-propyl-1 |

Formulae of representative dyes of the foregoing Examples are as follows :

Example 1 = Formula (VI)

Example 1 = Formula (VI)

Example 8

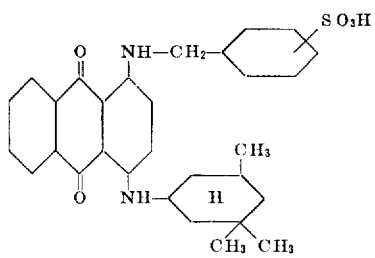

Examples 12 and 13

Examples 14 and 22... 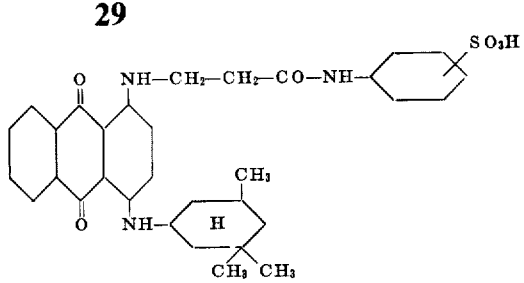
Example 15... 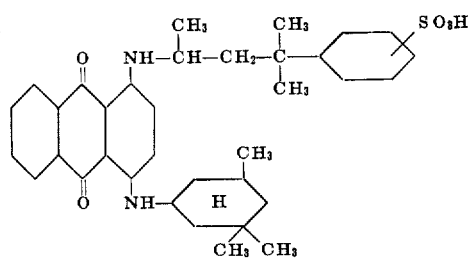
Examples 16 and 25... 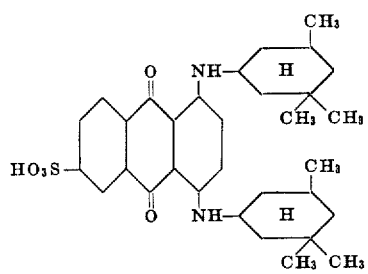
Examples 17 and 18... 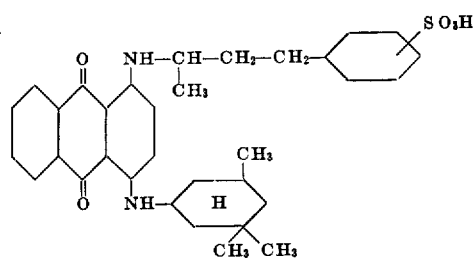
Example 19... 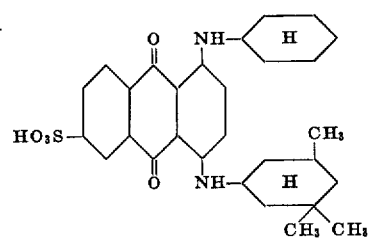
Example 20... 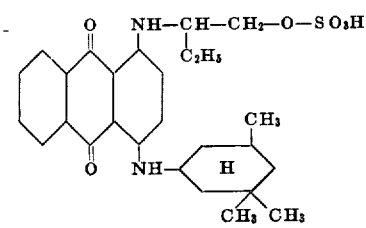
Example 21... 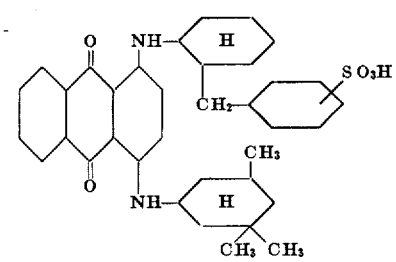

Example 23 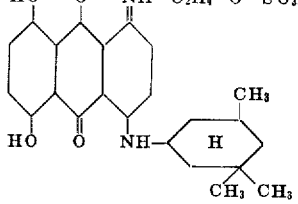

Example 24 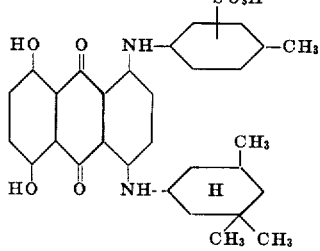

Example 26 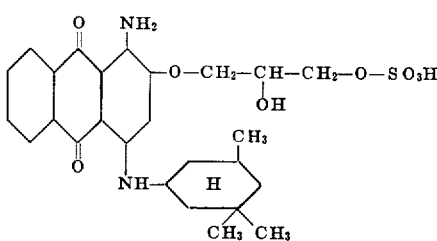

Example 27 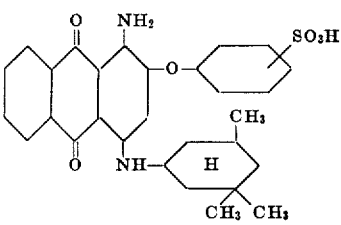

Example 28 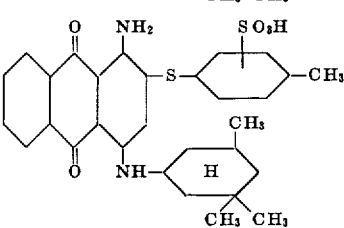

Having thus disclosed the invention, what we claim is:

1. A compound of the formula

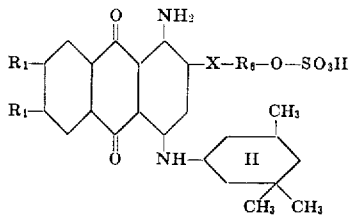

wherein
one $R_1$ is hydrogen, fluorine, chlorine or bromine or a —$SO_3H$-group and the other $R_1$ is hydrogen, or each $R_1$ is chlorine,
$R_6$ is —$CH_2$—$CH_2$—, —$CH_2$—$CH_2$—$CH_2$—,
—$CH_2$—$CH$—, —$CH$—$CH_2$—, —$CH_2$—$CH$—$CH_2$—,
   |              |                   |
   $CH_3$       $CH_3$              $OH$
or —$CH_2$—$CH_2$—(O—$CH_2$—$CH_2$)$_p$—,
X is —O— or —S—, and
$p$ is 1 to 9.

2. A compound according to claim 1 wherein X is oxygen.

3. A compound according to claim 2 wherein each $R_1$ is hydrogen.

4. A compound according to claim 3 wherein $R_6$ is —$CH_2$—$CH_2$—, —$CH_2$—$CH_2$—$CH_2$—,
—$CH$—$CH_2$—, —$CH_2$—$CH$—, or —$CH_2$—$CH$—$CH_2$—.
   |              |                   |
   $CH_3$       $CH_3$              $OH$ 5. A compound according to claim 1 wherein $R_6$ is —$CH_2$—$CH_2$—, —$CH_2$—$CH_2$—$CH_2$—,
—$CH$—$CH_2$—, —$CH_2$—$CH$—, or —$CH_2$—$CH$—$CH_2$—.
   |              |                   |
   $CH_3$       $CH_3$              $OH$ 6. The anthraquinone compound according to claim 4 of the formula

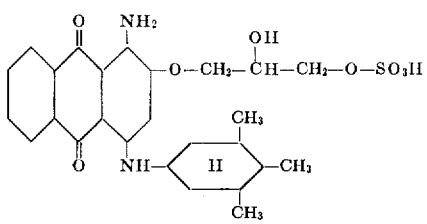

* * * * *